United States Patent
Simon et al.

(10) Patent No.: US 12,517,473 B2
(45) Date of Patent: Jan. 6, 2026

(54) GNSS TIME SYNCHRONIZATION IN REDUNDANT SYSTEMS

(71) Applicant: Waymo LLC, Mountain View, CA (US)

(72) Inventors: Axel Simon, Mountain View, CA (US); Zhuyuan Liu, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 333 days.

(21) Appl. No.: 18/169,493

(22) Filed: Feb. 15, 2023

(65) Prior Publication Data
US 2023/0185251 A1    Jun. 15, 2023

Related U.S. Application Data

(63) Continuation of application No. 17/135,484, filed on Dec. 28, 2020, now Pat. No. 11,604,439.

(51) Int. Cl.
  *G04R 20/04* (2013.01)
  *H04J 3/06* (2006.01)

(52) U.S. Cl.
  CPC ........... *G04R 20/04* (2013.01); *H04J 3/0641* (2013.01); *H04J 3/0644* (2013.01); *H04J 3/0682* (2013.01)

(58) Field of Classification Search
  CPC ...... G04R 20/04; H04J 3/0641; H04J 3/0644; H04J 3/0682; G01S 7/003; G01S 13/003; G01S 13/87
  See application file for complete search history.

(56) References Cited

U.S. PATENT DOCUMENTS

| | | |
|---|---|---|
| 6,236,623 B1 | 5/2001 | Read |
| 6,754,745 B1 | 6/2004 | Horvath |
| 7,724,612 B2 | 5/2010 | Azim |
| (Continued) | | |

OTHER PUBLICATIONS

International Search Report and Written Opinion for corresponding PCT application No. PCT/US2021/072515, dated Mar. 14, 2022.
(Continued)

*Primary Examiner* — Ladimir Magloire
*Assistant Examiner* — Ashley Brown Raynal
(74) *Attorney, Agent, or Firm* — McDonnell Boehnen Hulbert & Berghoff LLP

(57) ABSTRACT

Example embodiments relate to GNSS time synchronization in redundant systems. A redundant system configured with two subsystems may initially synchronize clocks from both subsystems to GNSS time from a GNSS receiver. The synchronization of the first subsystem's clock may involve using a first communication link that enables communication between the first subsystem and the GNSS receiver while the synchronization of the second subsystem's clock may involve using both the first communication link and a second communication link that enables communication between the subsystems. The redundant system may then synchronize the first subsystem's clock to the second subsystem's clock while the second subsystem's clock is still synchronized to GNSS time from the GNSS receiver based on timepulses traversing a pair of wires that connect the subsystems and the GNSS receiver.

20 Claims, 13 Drawing Sheets

(56) References Cited

U.S. PATENT DOCUMENTS

| | | | |
|---|---|---|---|
| 7,876,790 | B2 | 1/2011 | Cho |
| 7,957,897 | B2 | 6/2011 | Basnayake |
| 8,138,970 | B2 | 3/2012 | Whitehead |
| 8,705,578 | B2 | 4/2014 | Fang |
| 9,116,220 | B2 | 8/2015 | Liu |
| 9,451,218 | B2 | 9/2016 | Hanabusa |
| 9,661,472 | B2 | 5/2017 | Luca |
| 9,843,405 | B2 | 12/2017 | Aweya |
| 2009/0168808 | A1 | 7/2009 | Cho |
| 2012/0082188 | A2 | 4/2012 | Nicholls |
| 2014/0145875 | A1 | 5/2014 | Hann |
| 2015/0127284 | A1 | 5/2015 | Seshan |
| 2016/0320481 | A1* | 11/2016 | Ling .................. G01S 13/87 |
| 2017/0006568 | A1 | 1/2017 | Abedini |
| 2017/0078400 | A1 | 3/2017 | Binder |
| 2021/0006344 | A1* | 1/2021 | Chen .................. G01S 19/14 |
| 2021/0011121 | A1* | 1/2021 | Arbabian ............ G01S 7/415 |

OTHER PUBLICATIONS

Honkala et al., "Performance of EGNSS-Based Timing in Various Threat Conditions" IEEE Transactions on Instrumentation and Measurement, 69(5)2287-2299 (2020).

Meier et al., "IEEE 1588 applied in the environment of high availability LANs", 2007 International IEEE Symposium on Precision Clock Synchronization (ISPCS) for Measurement, Control and Communication, Vienna, Austra, Oct. 1-3, 2007.

Hollos et al., "Improved Reference Clock Connection Interface for Prototype IEEE 1588 Master Clocks", IEEE pp. 371-376 (2018).

\* cited by examiner

| Mode | 0 | 1 | 2 | 3 | 4 | 5 | 6 |
|---|---|---|---|---|---|---|---|
| FSM on A | A | B | C | C | D | D | E |
| FSM on B | A | A | B | D | D | E | failed |

FIGURE 5

GNSS TIME SYNCHRONIZATION IN REDUNDANT SYSTEMS

CROSS REFERENCE TO RELATED APPLICATION

The present application is a continuation of U.S. patent application Ser. No. 17/135,484, filed on Dec. 28, 2020, the entire contents is hereby incorporated by reference.

BACKGROUND

Smartphones, wearable computing devices, vehicle navigation systems, and other types of devices often include a receiver configured to perform operations using the Global Positioning System (GPS), and other GNSS (Global Navigation Satellites Systems). GPS is a satellite-based navigation system that involves a network of satellites configured to transmit positioning signals (i.e., signals) while circling Earth in a precise orbit. Each satellite transmits signals that include information for receivers to use, such as an indication of the time that each signal was transmitted by the satellite and position information for the satellite. Other GNSS such as GLONASS, Galileo, BeiDou, QZSS, and IRNSS operate similarly. As such, a receiver may receive and use information within signals from multiple satellites to estimate its location. For example, the receiver may use trilateration to estimate the user's location on the surface of Earth by timing signals obtained from at least four GNSS satellites.

Devices can also use signals from GNSS (or similar systems) to obtain direct and accurate access to GNSS time. GNSS timing and synchronization is used in a variety of systems, including many critical infrastructures. For instance, communication networks (e.g., 4G/5G mobile phone networks), banking systems, and electricity grids rely upon high accuracy time and frequency stability. Within various applications, receivers at different locations can establish and maintain synchronization using GNSS reference time.

SUMMARY

Example embodiments describe techniques for synchronizing two halves of a redundant system to GNSS time. A control system with a redundant configuration may use techniques described herein to synchronize the clocks of subsystems to GNSS time and subsequently minimize clock offset between the clocks in situations where access to GNSS time is temporarily unavailable. Such techniques can be used by vehicle systems to reduce potential interface with nearby vehicles by using GNSS time as a central reference to align timing for operations.

In one aspect, an example method is provided. The method involves synchronizing, at a first subsystem of a redundant system, a first clock to GNSS time from a GNSS receiver using a first communication link. The redundant system includes the first subsystem and a second subsystem and the first communication link enables communication between the first subsystem and the GNSS receiver. In addition, the first subsystem, the second subsystem, and the GNSS receiver are electrically coupled together via a pair of wires. The method further involves synchronizing, at the second subsystem, a second clock to GNSS time from the GNSS receiver using the first communication link and a second communication link. The second communication link enables communication between the first subsystem and the second subsystem. The method also involves synchronizing the first clock to the second clock such that the first clock is synchronized to the second clock and the second clock is synchronized to GNSS time from the GNSS receiver based on timepulses traversing the pair of wires.

In another aspect, an example system is provided. The system includes a GNSS receiver, a set of communication links, a pair of wires, and a redundant system having a first subsystem and a second subsystem. The redundant system is configured to synchronize, at the first subsystem, a first clock to GNSS time from the GNSS receiver using a first communication link. The first communication link enables communication between the first subsystem and the GNSS receiver. The redundant system is also configured to synchronize, at the second subsystem, a second clock to GNSS time from the GNSS receiver using the first communication and a second communication link. The second communication link enables communication between the first subsystem and the second subsystem. The redundant system is also configured to, based on timepulses traversing the pair of wires, synchronize the first clock to the second clock such that the first clock is synchronized to the second clock and the second clock is synchronized to GNSS time from the GNSS receiver.

In yet another example, a non-transitory computer-readable medium is provided. The non-transitory computer-readable medium is configured to store instructions that, when executed by a redundant system comprising a first subsystem and a second subsystem, causes the redundant system to perform operations. The operations involve synchronizing, at the first subsystem, a first clock to GNSS time from a GNSS receiver using a first communication link, wherein the redundant system includes the first subsystem and a second subsystem. The first communication link enables communication between the first subsystem and the GNSS receiver, and the first subsystem, the second subsystem, and the GNSS receiver are electrically coupled together via a pair of wires. The operations also involve synchronizing, at the second subsystem, a second clock to GNSS time from the GNSS receiver using the first communication link and a second communication link. The second communication link enables communication between the first subsystem and the second subsystem. The operations also involve synchronizing the first clock to the second clock such that the first clock is synchronized to the second clock and the second clock is synchronized to GNSS time from the GNSS receiver based on timepulses traversing the pair of wires.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 illustrates mapping modes to a finite state machine for the halves of the redundant system, according to one or more example embodiments

DETAILED DESCRIPTION

Figure 1:
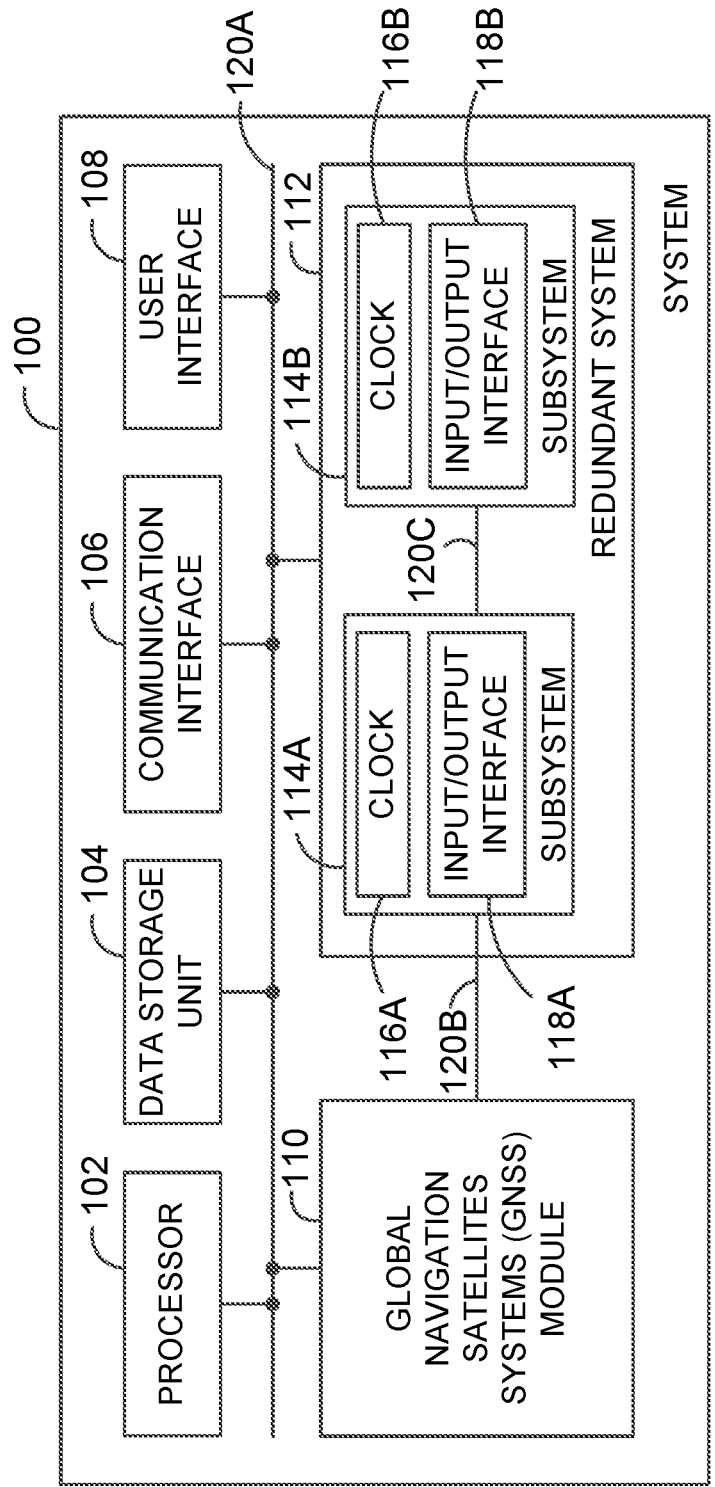
FIG. 1 is a simplified block diagram for a computing system, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Clock synchronization involves coordinating independent clocks. Even when initially set accurately, clocks can differ after some amount of time due to clock drift caused by clocks counting time at slightly different rates. As such, GNSS offers direct and accurate access to GNSS time (e.g., Coordinated Universal Time (UTC)) and is often used as a universal time that devices can rely upon for synchronization with other devices. Technologies enable the synchronization of time across several devices via Ethernet messages. For instance, IEEE 1588 Precision Time Protocol (PTP) can be used to synchronize clocks based on time provided by a GNSS receiver. When GNSS reception is temporarily insufficient to obtain precise time, the local clock can be used to estimate global time until GNSS reception improves again. A system that switches to a local clock when GNSS reception is temporarily unavailable is in a holdover state.

PTP can be used to tune the clocks within a car to be within 100 nanoseconds of each other. While many applications require far less stringent timing synchronization, the need for inter-car synchronization implies that meeting any timing requirement becomes a tradeoff between holdover capability and the error due to local clock synchronization. For example, a vehicle may lose GNSS reception when entering and traveling within a tunnel. At the same time, the temperature encountered by the vehicle may also drop due to the environment within the tunnel differing from the outside environment. In such a situation, a highly accurate oscillator that drifts by 1 ppb over the temperature range can cause a divergence from global time of up to 1 nanosecond per second. If the car resides in the tunnel for 10 minutes, the error of the clock can be as large as 600 ns when exiting the tunnel. This clock error can disrupt the performance of some vehicle sensors. For example, if a sensor on the car can accept 1.5 µs clock offset without causing interference, each car may only be off by 1.5 µs/2=750 ns before sensors interfere and cause the detection of spurious objects that affect the vehicle's ability to proceed. Given the assumed holdover performance of 1 ppb and a base accuracy of PTP of 100 ns, a car can drive (750 ns−100 ns)/1 ppb=625 seconds (approximately 10 minutes) without GNSS reception before degraded sensor performance has to be assumed. In order not to reduce this time, it may require the source of PTP to be accurate to a few tens of nanoseconds.

A cost effective way to make a system redundant is to conceptually split the system into two halves that both work together during normal operation. Each half may be configured to operate in a degraded mode in case fault occurred in the other half. While PTP can be used to synchronize the clocks of the two halves in normal operation, it could cause the clocks of both halves to be offset by 100 ns, which can indicate that the sensors that are connected to different halves are assumed to have a clock delta that is 100 ns higher that the clock delta between sensors that are connected to the same half.

Example embodiments relate to systems and methods that enable synchronization between multiple systems in a redundant configuration to an accuracy of a few tens of nanoseconds. Some examples describe techniques that can provide precise time to both subsystems within a redundant system. For instance, given a control system composed of two halves that work together until a fault occurs in one half at which point the other half takes over, example techniques may involve hardware and software that can provide precise time to both halves. As such, examples can allow the time to be sourced by a single (non-redundant) GNSS receiver and enable time synchronization between the two halves to be maintained even if GNSS reception is temporarily too weak to provide GNSS time.

Some example embodiments involve using techniques within an autonomous or semi-autonomous vehicle context. For instance, an autonomous vehicle may use a circular array of radars to cover a 360 degree view that extends around the vehicle. In a control system with two subsystems, each subsystem may control every other radar to maximize the field of vision in case one of the subsystems fails. Time synchronization between the two subsystems can impact the radar performance as well as other autonomous operations performed by the vehicle. In particular, time synchronization can enable neighboring radar to start chirps at different times, which avoids cross-radar interference. In addition, aligning time to GNSS time can also allow radar on different cars to coordinate their chirp start times as a way to avoid inter-car interference.

GNSS receivers generally communicate time through a hardware signal (e.g., through an output onto which a rising edge is emitted whenever a second commences) and a communication link (e.g., a serial, RS232-like interface) through which the UTC or TAI time at the hardware signal is communicated. The modules can provide the ability to measure the time of a rising edge of an input pin. An example system may incorporate a circuit based on these hardware wires that can make it possible to synchronize clocks to a higher accuracy than 100 ns. The signals on these hardware wires are described herein as timepulses.

In some examples, a system may not be redundant until both halves have synchronized at least once to global time. As such, synchronization to global time can happen through GNSS or, if no GNSS signal is available at startup, through some other means. Each half of the system can timestamp incoming rising edges and generate outgoing rising edges at precise times. These times can be measured with the clock that is tuned to GNSS time. If the main system lacks this ability, a microcontroller unit (MCU) on each half can provide these inputs and outputs, tune its local clock to GNSS time and distribute the synthesized time over Ethernet using PTP. The system may also include a communication link between the two halves that is operational at start up and can be used to perform the first synchronization to global time.

Referring now to the figures, FIG. 1 is a simplified block-diagram of an example system 100 that can perform various acts and/or functions, such as those described herein. System 100 may correspond to any type of device, such as a vehicle system, computing device, sensor processing unit, smartphone, portable computer, or wearable computing device, etc., and can include various components, such as processor 102, data storage unit 104, communication interface 106, user interface 108, GNSS module 110, and redundant system 112.

These components as well as other possible components can connect to each other (or to another device, system, or other entity) via connection mechanisms 120A, 120B, and 120C, which each represents a mechanism that facilitates communication between two or more devices, systems, or other entities. As such, connection mechanisms 120A-120C can be simple mechanisms, such as a cable or system bus, or a relatively complex mechanism, such as a packet-based communication network (e.g., the Internet). In some instances, a connection mechanism can include a non-tangible medium (e.g., where the connection is wireless).

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause system 100 to perform one or more acts and/or functions, such as those described in this disclosure. System 100 can be configured to perform one or more acts and/or functions, such as those described in this disclosure. Such program instructions can define and/or be part of a discrete software application. In some instances, system 100 can execute program instructions in response to receiving an input, such as from communication interface 106 and/or user interface 108. Data storage unit 104 may also store other types of data.

Communication interface 106 can allow system 100 to connect to and/or communicate with another entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as a router, switcher, or other network device. Likewise, a transmission can be a direct transmission or an indirect transmission.

User interface 108 can facilitate interaction between system 100 and a user of system 100, if applicable. As such, user interface 108 can include input components such as a keyboard, a keypad, a mouse, a touch sensitive panel, a microphone, and/or a camera, and/or output components such as a display device (which, for example, can be combined with a touch sensitive panel), a sound speaker, and/or a haptic feedback system. More generally, user interface 108 can include hardware and/or software components that facilitate interaction between system 100 and the user of the computing device system.

GNSS module 110 represents a component that system 100 may include for communication with GNSS satellites (e.g., passive reception of signals). GNSS module 110 may correspond to various types of receivers that may receive signals from satellites to use to perform operations, such as GNSS time determination and location and velocity determination processes. In particular, GNSS module 110 may include a clock or another component that can be aligned with GNSS time based on GNSS time information obtained within one or more signals from GNSS satellites. Each GNSS satellite may have multiple atomic clocks that contribute very precise GNSS time data within signals received by GNSS module 110 and other receivers. GNSS module 110 may receive and decode the signals to synchronize the local clock at GNSS module 110 to the atomic clocks. As such, GNSS module 110 may operate using assistance from one or more processors 102, or assistive information obtained via the communication interface 106.

Redundant system 112 may represent a control system and/or another type of system configured to perform operations using redundancy to increase reliability. Redundancy involves the duplication of critical components or functions within a system (e.g., system 100) with the aim of increasing reliability. Redundancy measures can involve implementing a backup or failsafe in some instances. In other instances, redundancy may be used to increase performance of system 100. Various types of applications may utilize redundant systems, such as autonomous vehicle sensors and control systems.

In the embodiment shown in FIG. 1, redundant system 112 includes two halves represented as subsystem 114A and subsystem 114B. Subsystems 114A, 114B may perform similar operations and can be implemented for redundancy measures shown above. As further shown, subsystem 114A includes clock 116A and input/output interface 118A and subsystem 114B includes clock 116B and input/output interface 118B.

As indicated above, connection mechanisms 120A, 120B, 120C may connect components of system 100 and is illustrated as a wired connection, but wireless connections may also be used in some implementations. For example, connection mechanisms 120A-120C may be a wired serial bus such as a universal serial bus or a parallel bus. A wired connection may be a specialized connection as well.

Figure 2:
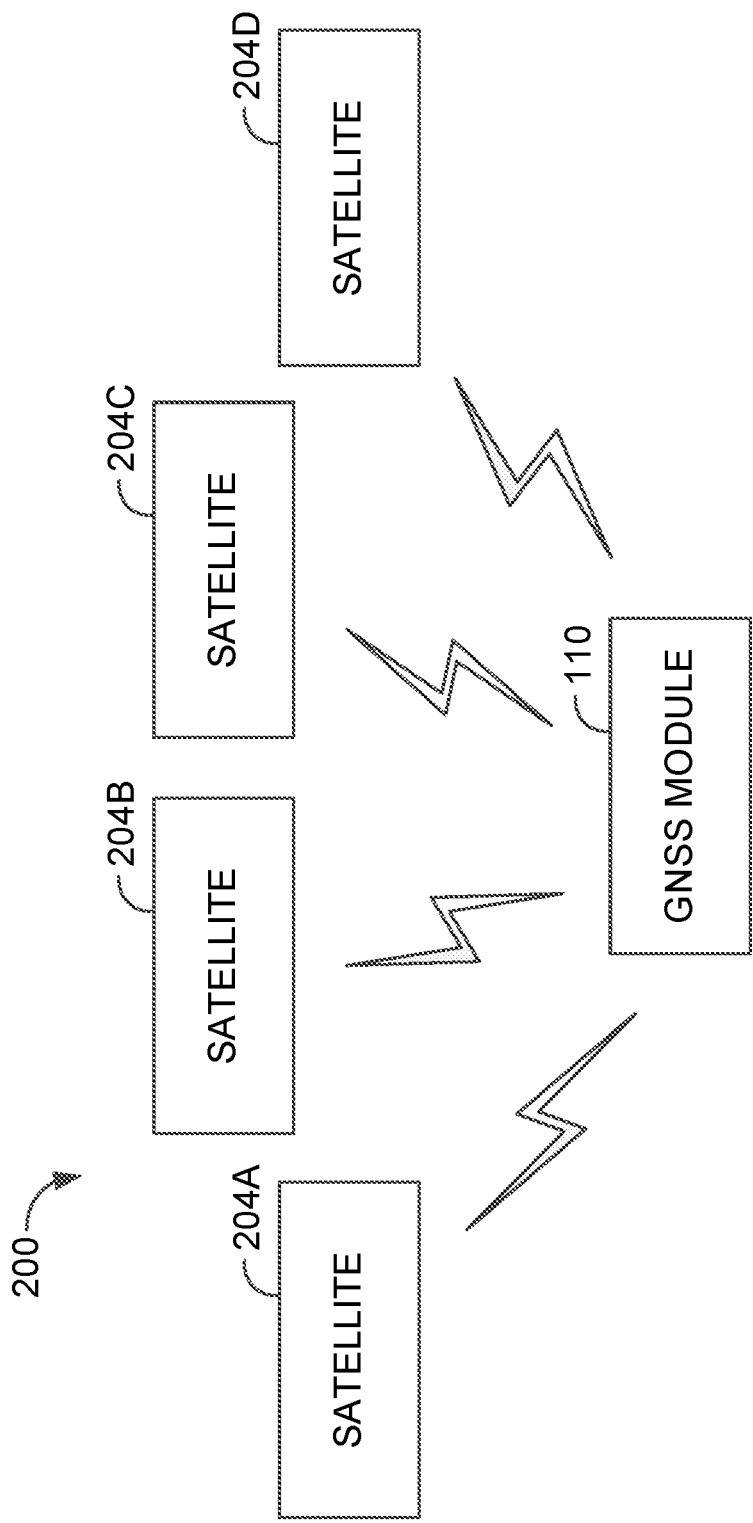
FIG. 2 illustrates a GNSS module receiving signals from a set of satellites, according to one or more example embodiments

FIG. 2 illustrates GNSS module 110 receiving signals from a set of satellites. In example embodiment, scenario 200 shows GNSS module 110 receiving and potentially using signals from multiple satellites (satellite 204A, satellite 204B, satellite 204C, and satellite 204D) to determine information. Within other implementations, scenario 200 may involve more or fewer satellites and/or receivers.

GNSS module 110 may passively receive signals from one or more satellites 204A-204D during operation of system 100. The signals can include information that enables GNSS module 110 and other components of system 100 to perform a variety of operations, including location and velocity determination. A signal from any of satellites 204A-204D can also give GNSS module 110 access to GNSS time (e.g., UTC). GNSS module 110 can receive GNSS time information within signals obtained from one or more satellites 204A-204D and enable components within system 100 to synchronize to GNSS time.

Satellites 204A-204D as well as other satellites in the GNSS network may orbit Earth and periodically transmit signals having information that receivers may use for operations by various types of receiver devices, including GNSS synchronization. Each transmitted signal may include information that assists receivers perform location determination, such as an indication of the time that the satellite transmitted the signal towards the surface of Earth based on the satellite's atomic clock. A transmitted signal may also provide other information, such as an indication of the relationship between the satellite's clock and GNSS time, or the reference time of other GNSS, and precise orbit information that helps the receiver determine a position of the transmitting satellite. As such, GNSS module 110 as well as other receivers may receive and use the periodically transmitted signals from the set of satellites to determine GNSS time, location, and/or other possible information. Reception of signals from multiple satellites (e.g., four satellites) may enable a receiver to perform location determination processes, such as the trilateration calculations.

Figure 3:
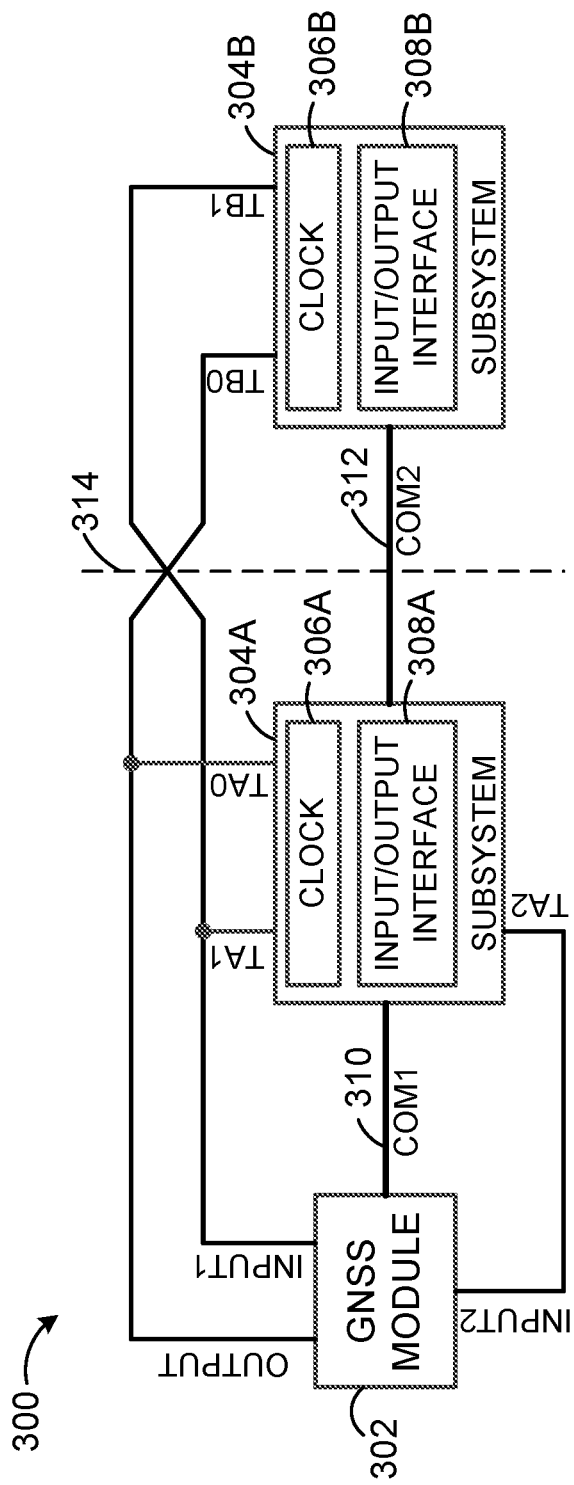
FIG. 3 illustrates a system for synchronizing subsystems in a redundant system, according to one or more example embodiments.

FIG. 3 illustrates system 300 for synchronizing subsystems in a redundant system, according to one or more example embodiments. System 300 includes a hardware circuit configuration that can distribute time between GNSS module 302 and two halves of a redundant system, which are shown as subsystem 304A and subsystem 304B. Software logic that may be implemented with the hardware circuit by system 300 is illustrated below and summarized in FIG. 5. In some examples, system 300 may be implemented as system 100 shown in FIG. 1. In other embodiments, system 300 can have another arrangement with more or less components.

GNSS module 302 represents a GNSS receiver and corresponding hardware capable of receiving an indication of GNSS time from one or more GNSS satellites. Particularly, GNSS module 302 can operate in a passive mode that receives signals continuously and/or periodically from GNSS satellites. These signals can include information that specify GNSS time, which can be used for synchronization of different components, such as subsystem 304A and subsystem 304B.

Subsystems 304A, 304B represent different halves of a redundant system, which are shown separated via division line 314. Subsystems 304A, 304B may be configured to perform similar operations, which can enable one subsystem to continue operations if the other subsystem fails. As an example, subsystems 304A, 304B can be part of a vehicle sensor system that enable sensor data to be obtained and used even if one of the subsystems fails. In the embodiment shown in FIG. 3, subsystem 304A includes clock 306A and input/output interface 308A, and subsystem 304B similarly includes clock 306B and input/output interface 308B. Each clock 306A, 306B may be used to keep time locally at each subsystem, respectively. Input/output interface 308A, 308B can be used to execute logic and communicate with each other and GNSS module 302 via communication interface (COM1) 310 and communication interface (COM2) 312. In addition, input/output interfaces 308A, 308B may each implement a simple state machine. Subsystems 304A, 304B can include more or less components in other embodiments.

In some situations, GNSS module 302 may lose connectivity to GNSS satellites. For instance, GNSS module 302 may be blocked from receiving signals and/or may receive weak signals that are insufficient for determining GNSS time information that can be used by system 300 to synchronize subsystem 304A and subsystem 304B as well as other operations. For example, when system 300 is coupled to a vehicle, some situations can arise where GNSS module 302 temporarily loses connectivity to GNSS satellites during vehicle navigation. For instance, when the vehicle navigates into a tunnel, the tunnel may prevent GNSS module 302 from passively receiving signals from a GNSS satellite that indicates the current GNSS time.

In such cases where GNSS time information may be unavailable, system 300 can perform operations described herein that enable synchronization between subsystem 304A and subsystem 304B. Particularly, the hardware circuit and software logic executable by input/output interfaces 308A, 308B can enable initial synchronization of clocks 306A, 306B to GNSS time provided by GNSS module 302 and subsequently minimize drift between clocks 306A, 306B when GNSS time is unavailable.

In the embodiment shown in FIG. 3, GNSS module 302 includes OUTPUT, INPUT 1, and INPUT2. OUTPUT represents the pin on which GNSS module 302 outputs timepulses, which can be based on GNSS time information received from GNSS satellites (or another source). INPUT1 and INPUT2 represent pins on which GNSS module 302 can measure timepulses received from subsystems 304A, 304B, respectively. Timepulses provided by subsystems 304A, 304B may depend on clocks 306A, 306B, respectively, and can be communicated via input/output interface 308A, 308B.

System 300 may perform a series of techniques described herein as modes. Each mode described herein serves as a conceptual aid in understanding the synchronization mechanism. For instance, MODE 0 may represent the initial state of system 300 and a transition from MODE 0 to MODE 1 when GNSS time becomes available. This condition may be met when observing timepulses on OUTPUT and messages about their global time on COM1 310. As such, the modes are described herein to help illustrate different states that system 300 may exist in and transition between based on prior states of system 300 as well as the availability of GNSS time information at GNSS module 302.

Figure 4A:
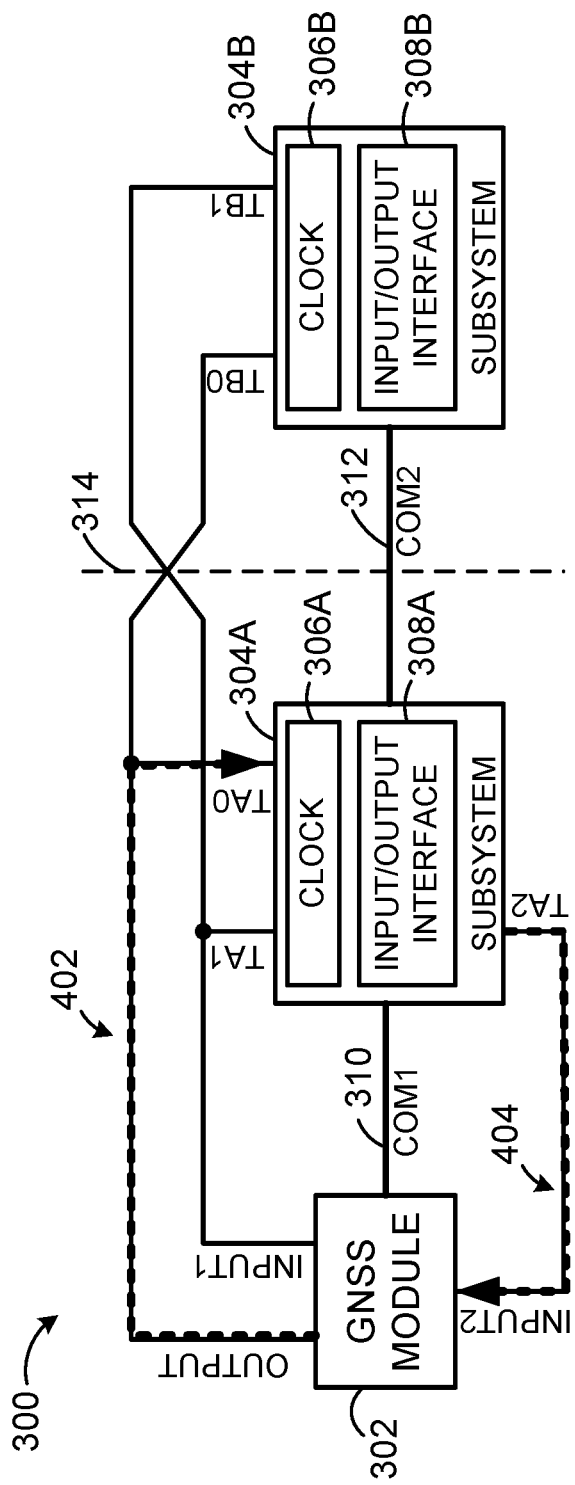
FIG. 4A illustrates a first half of a redundant system synchronizing to GNSS time, according to one or more example embodiments.

FIG. 4A illustrates subsystem 304A of system 300 synchronizing clock 306A to GNSS time. In the embodiment shown in FIG. 4A, system 300 is in MODE 1, which indicates that GNSS time is available at GNSS module 302 and an initial synchronization to GNSS time can be performed. When GNSS time is not available, system 300 may be in MODE 0, which involves waiting for the availability of GNSS time information at GNSS module 302.

When system 300 is in MODE 1, timepulse 402 on OUTPUT at time $(t_1)$ is measured on TA0 of subsystem 304A at time $(t_2)$, and timepulse 404 on TA2 at time $(t_3)$ is measured on INPUT2 of GNSS module 302 at time $(t_4)$. At this point, time $(t_1)$ and time $(t_4)$ correspond to GNSS times and time $(t_2)$ and time $(t_3)$ are times measured by clock 306A in input/output interface 308A of subsystem 304A. GNSS times $(t_1)$ and $(t_4)$ are sent over COM1 310, which enables the clock offset ($o_{GNSS}^A$) between clock 306A of subsystem 304A and GNSS time to be calculated as follows:

$$o_{GNSS}^A = (t_2 - t_1) + p_{GNSS}^A \quad (1)$$

where path delay ($p_{GNSS}^A$) represents the path delay between GNSS module 302 and subsystem 304A. Under the assumption that the timepulses take an equal amount of time to travel from OUTPUT to TA0 as they take to travel from TA2 to INPUT2, the path delay ($p_{GNSS}^A$) can be computed by following the principles described in the PTP standard (IEEE1588) as follows:

$$p_{GNSS}^A = \frac{1}{2}((t_2 - t_1) + (t_4 - t_3)) \quad (2)$$

Once the path delay ($p_{GNSS}^A$) is computed, system 300 may transition to MODE 2 by forwarding the times communicated on COM1 310 (e.g., GNSS times ($t_1$) and ($t_4$)) to subsystem 304B via COM2 312.

Figure 4B:
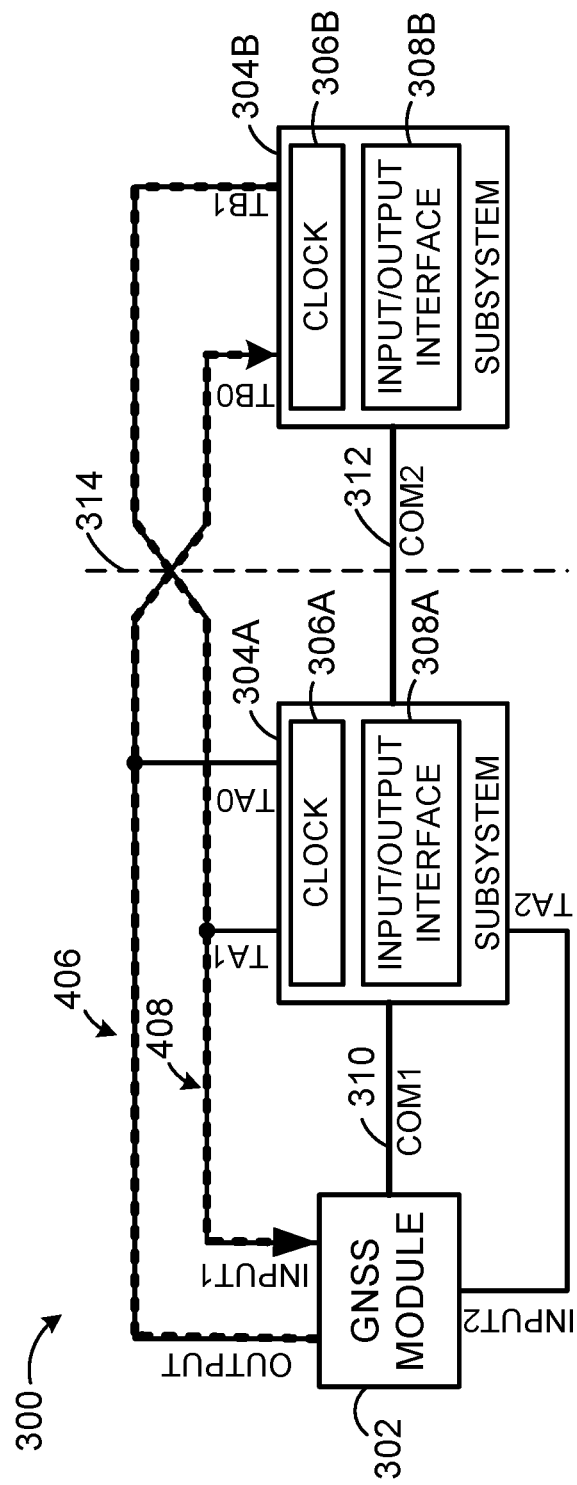
FIG. 4B illustrates synchronizing the second half of the redundant system to GNSS time and measuring the path delay, according to one or more example embodiments.

FIG. 4B illustrates system 300 synchronizing subsystem 304B to GNSS time and measuring wire delay. In MODE 2, timepulse 406 on OUTPUT of GNSS module 302 is measured on TB0 by input/output interface 308B of subsystem 304B, which produces time ($t_1$) and time ($t_2$), and timepulse 408 on TB1 is measured on INPUT1 at GNSS module 302 resulting in time ($t_3$) and time ($t_4$). At this point, time ($t_1$) and time ($t_4$) are GNSS times and time ($t_2$) and time ($t_3$) are times measured by clock 306B of subsystem 304B. The GNSS times are sent over COM1 310 to input/output interface 308A of subsystem 304A, which can subsequently forward the GNSS times to input/output interface 308B of subsystem 304B via COM2 312. System 300 can use an analogous computation as in MODE 1 (i.e., equations 1 and 2 shown above) to compute the clock offset ($o_{GNSS}^B$) and path delay ($p_{GNSS}^B$), assuming similar symmetry of timepulse travel times between OUTPUT to TB0 and TB1 to INPUT1. Once synchronized, the time information received on COM2 312 may no longer be needed, as the global time for system 300 can be inferred by incrementing the known global time with each pulse received on TB0 of subsystem 304B. In some examples, subsystem 304A may optionally continue to re-compute path delay ($p_{GNSS}^A$) by observing measured times on INPUT2.

Figure 4C:
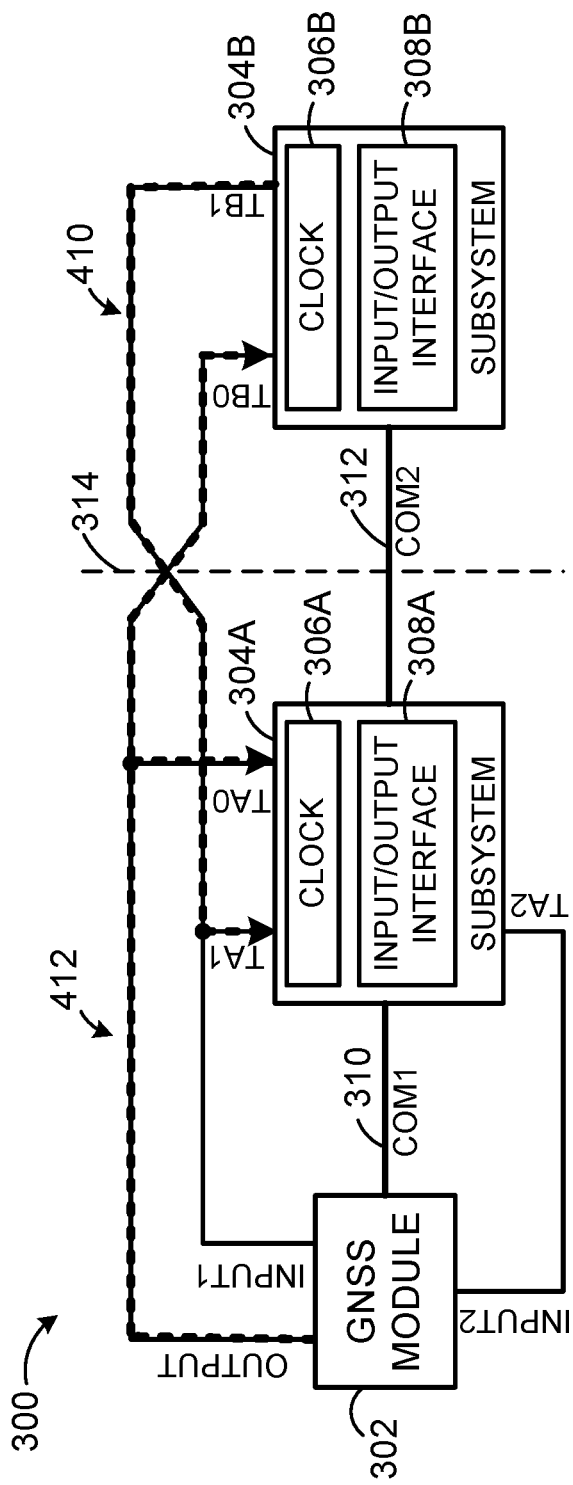
FIG. 4C illustrates determining a path delay between the halves of the redundant system, according to one or more example embodiments.

FIG. 4C illustrates system 300 determining wire delay between subsystem 304A and subsystem 304B. System 300 is shown in MODE 3 in FIG. 4C. When in MODE 3, timepulses 410 emitted by input/output interface 308B of subsystem 304B on TB1 are measured by input/output interface 308A of subsystem 304A on TA1.

In addition, similar to MODE 1, TA0 of subsystem 304A measures timepulses 412 that GNSS module 302 emitted via OUTPUT. For a given timepulse from GNSS module 302, input/output interface 308B from subsystem 304B generates a timepulse on TB1. For instance, $t_{OUTPUT}$, $t_{TA0}$, $t_{TA1}$, $t_{TB0}$, and $t_{TB1}$ can be used to denote the measured pulse times for the respective pin converted into GNSS time. Subsystem 304A can use the following relationships to infer the path delay ($p_B^A$) from subsystem 304B to subsystem 304A as follows:

$$t_{TB0} = t_{OUTPUT} + p_{GNSS}^B \quad (3)$$

$$t_{TA0} = t_{OUTPUT} + p_{GNSS}^A \quad (4)$$

$$t_{TA1} = t_{TB1} + p_B^A \quad (5)$$

$$t_\Delta = t_{TA0} - t_{TA1} \quad (6)$$

System 300 may enable subsystem 304B to continuously align its timepulses on TB1 to the timepulses on OUTPUT (i.e., $t_{TB1} = t_{OUTPUT}$) by availing itself of equation 3, which can be rewritten as follows:

$$t_{OUTPUT} = t_{TB0} - p_{GNSS}^B \quad (7)$$

This reduced equation 5 to:

$$t_{TA1} = t_{OUTPUT} + p_B^A \quad (8)$$

Substituting equation 8 into equation 6 produces the following:

$$t_\Delta = t_{TA0} - t_{OUTPUT} - p_B^A \quad (9)$$

$$= p_B^A - p_{GNSS}^A$$

Thus, the path delay ($p_B^A$) from subsystem 304B to subsystem 304A can be defined as:

$$p_B^A = t_\Delta + p_{GNSS}^A \quad (10)$$

Equation 10 represents an example to obtain the path delay ($p_B^A$) between TB1 and TA1. Other derivations for determining path delays between components within system 300 are possible.

At this point, subsystem 304A lacks knowledge of how well the output of TB1 of subsystem 304B is synchronized to the input timepulse on TB0 of subsystem 304B. As a result, subsystem 304A may be configured to continuously compute the path delay ($p_B^A$) using equation 10. Once the path delay ($p_B^A$) is available for the first time (or if path delay ($p_B^A$) is reasonably stable), system 300 can transition into MODE 4.

In some examples, subsystem 304A may optionally continue to compute path delay ($p_{GNSS}^A$) by observing measured times on INPUT2 of GNSS module 302. This action is not shown in FIG. 4C. Similarly, subsystem 304B may optionally continue to compute path delay ($p_{GNSS}^B$) by observing measured times on INPUT1 of GNSS module 302. This action is also not shown in FIG. 4C.

Figure 4D:
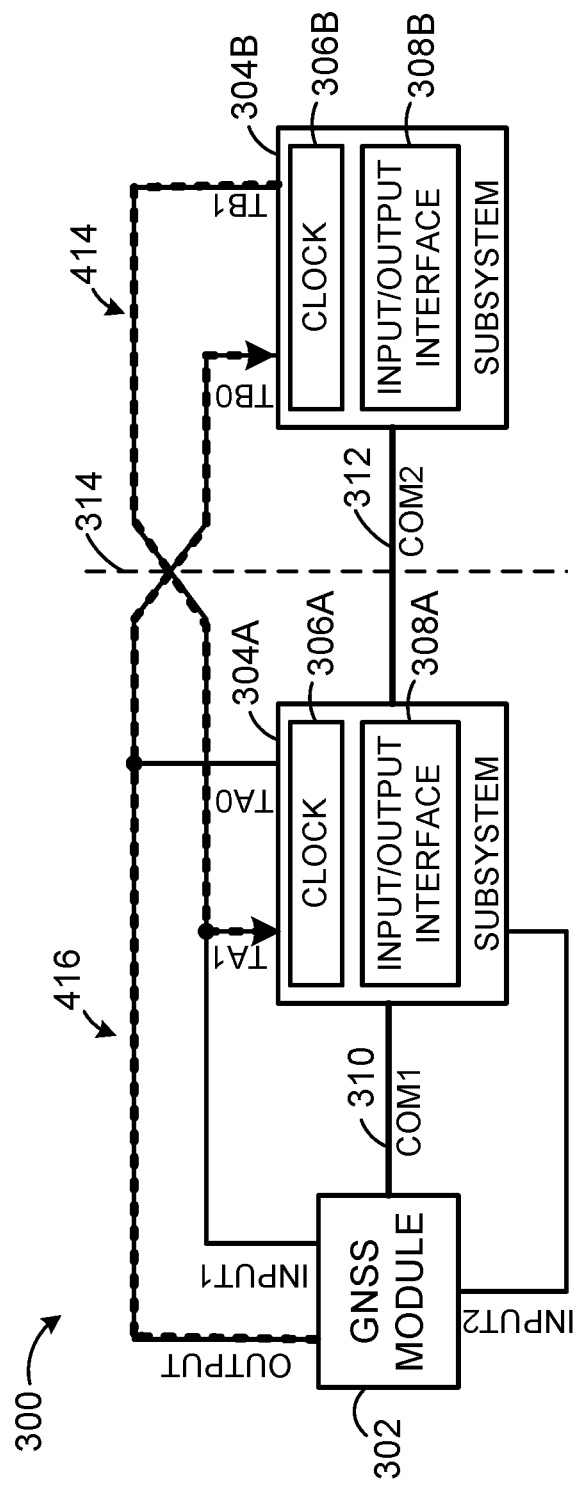
FIG. 4D illustrates synchronizing the clock of the first half of the redundant system to the clock of the second half of the redundant system, according to one or more example embodiments.

FIG. 4D illustrates system 300 synchronizing subsystem 304A to subsystem 304B with subsystem 304B synchronized to GNSS time. Input/output interface 308A of subsystem 304A is shown synchronizing clock 306A using timepulses 414 from subsystem 304B arriving on TA1 with the path delay ($p_B^A$). At this point, the GNSS time information communicated on COM1 310 and COM2 312 is no longer needed since the GNSS time can be carried forward by incrementing the last known global time with each pulse on TA1/TB1. As such, COM1 310 and COM2 312 may be severed without impacting performance of system 300.

When system 300 is in MODE 4, system 300 is in a normal operating state where GNSS time is available. When GNSS reception becomes too poor to synthesize global time in GNSS module 302, GNSS module 302 may cease to emit timepulses on OUTPUT. As a result, system 300 may transition to MODE 6 ("holdover") since GNSS module 302 lacks access to time information.

Figure 4E:
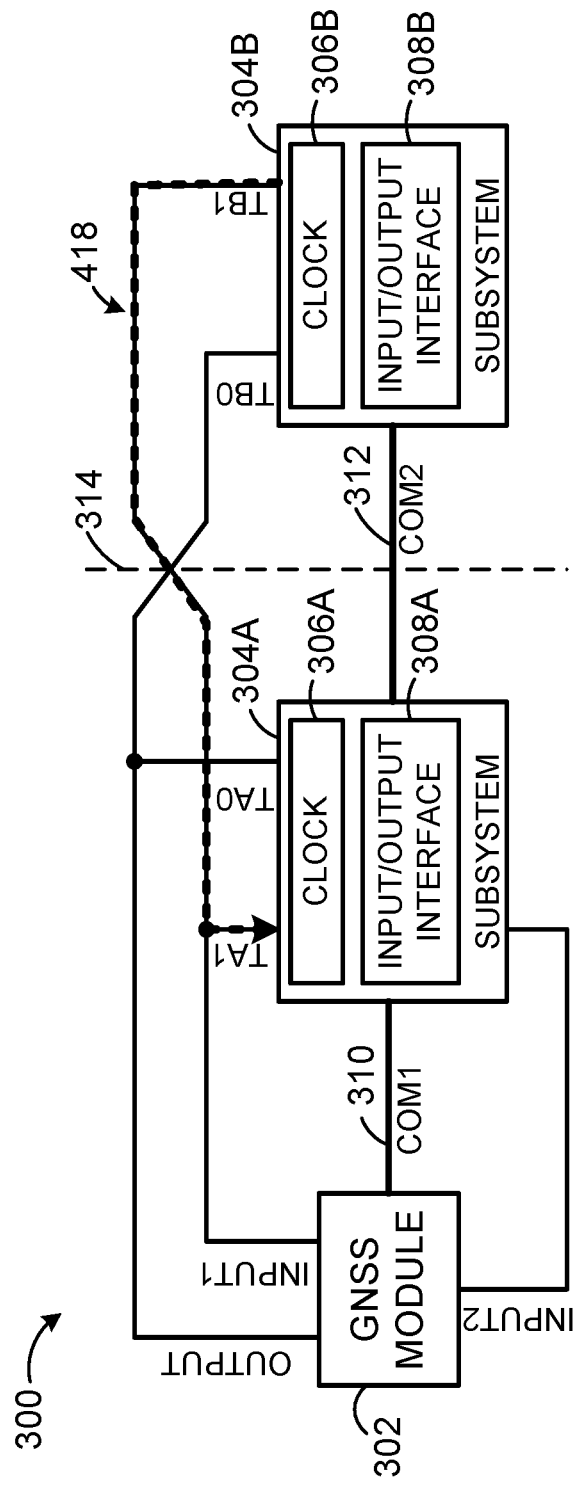
FIG. 4E illustrates the second half of the redundant system in a holdover state, according to one or more example embodiments.

FIG. 4E illustrates subsystem 304B in holdover. When system 300 is in MODE 5, input/output interface 308B of subsystem 304B may implement the holdover by tracking time for both subsystem 304A and subsystem 304B. Input/output interface 308B of subsystem 304B continues to emit timepulses 418 on TB1 based on clock 306B. As such, input/output interface 308A of subsystem 304A can continue to synchronize clock 306A to clock 306B of subsystem 304B similar to MODE 4 shown in FIG. 4C. Input/output interface 308A may observe a failure if no more time pulses are received on TA1 from input/output interface 308B.

Within system 300, input/output interface 308B of subsystem 304B may not distinguish the cause of the loss of GNSS time. In particular, input/output interface 308B may not differentiate between GNSS module 302 failing or subsystem 304A failing.

Figure 4F:
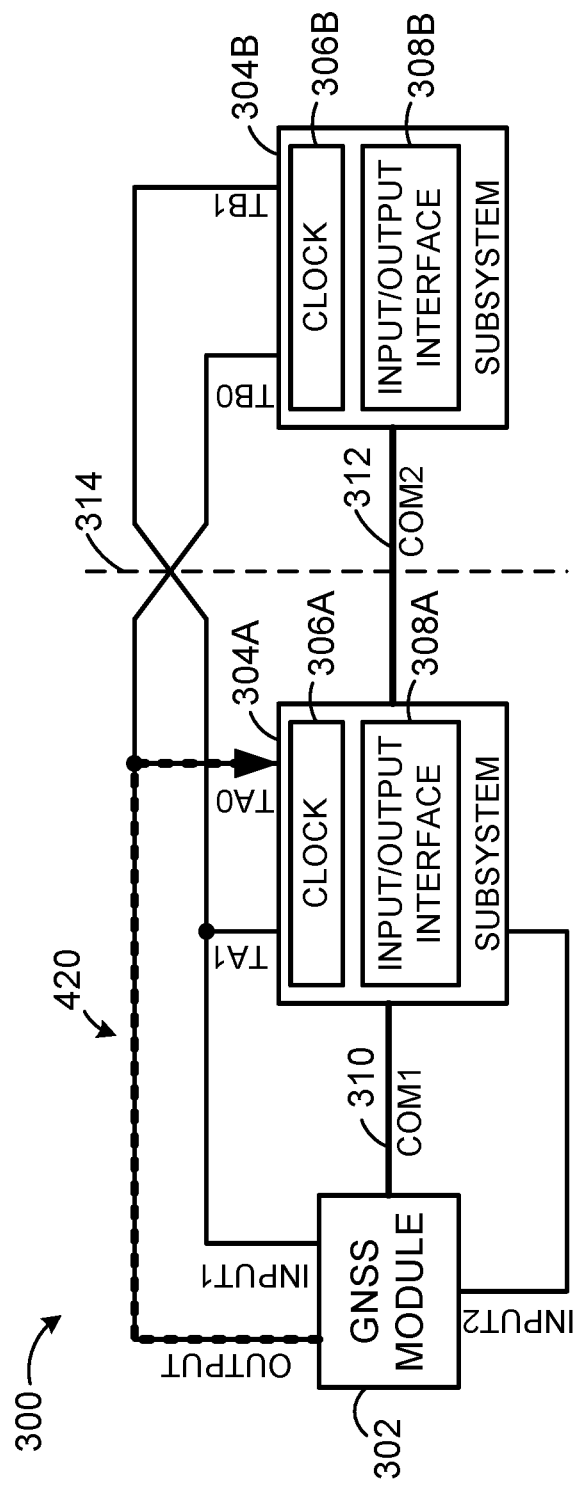
FIG. 4F illustrates synchronizing the first half of the redundant system to GNSS time after a failure at the second half has failed.

FIG. 4F illustrates subsystem 304A in holdover. When system 300 is in MODE 6, input/output interface 308A of subsystem 304A may stop receiving timepulses 418 on TA1 input, which triggers subsystem 304A to assume a failure at subsystem. As a result, input/output interface 308A now relies upon clock 306A as the reference clock source for subsystem 304. When GNSS time information is available at GNSS module 302, input/output interface 308A may detect timepulse 420 at TA0 and cause system 300 to transition to MODE 1 shown in FIG. 4A. In particular, timepulse 420 may convey GNSS time and be provided by GNSS module 302 via OUTPUT.

FIG. 5 illustrates the modes mapped to a finite machine executable by each input/output interface 308A, 308B from system 300. The software running on each subsystem 304A, 304B may be conceptually similar and can be realized by parameterizing a common implementation. This can create a redundancy for system 300 that enables subsystem 304A or subsystem 304B to continue operations of system 300 in the situation that another fails. Each subsystem 304A, 304B can implement the finite state machine (FSM) as shown in FIG. 5 to perform the synchronization techniques described herein. When system 300 is in MODE 0, FSM 504 for subsystem 304A and FSM 506 for subsystem 304B are both waiting for GNSS time.

As further shown in FIG. 5, when system 300 enters into MODE 1, FSM 504 specifies for subsystem 304A to transition to computing the path delay to GNSS module 302 while FSM 506 for subsystem 304B remains in the same state, which is waiting for GNSS time. Similarly, when system 300 transitions to MODE 2, FSM 504 triggers subsystem 304A to compute the path delay to subsystem 304B while FSM 506 causes subsystem 304B to transition to computing the path delay to GNSS module 302.

When system 300 is in MODE 3, FSM 504 causes subsystem 304A to remain in the same state, which involves computing the path delay to subsystem 304B. In addition, while in MODE 3, FSM 506 causes subsystem 304B transitions to a synchronized state. When system 300 is in MODE 4, both FSM 504 for subsystem 304A and FSM 506 for subsystem 304B are synchronized.

When system 300 is in MODE 5, FSM 504 for subsystem 304A remains in a synchronized state while FSM 506 for subsystem 304B transitions to holdover. System 300 will enter MODE 6 if subsystem 304B has failed. In this situation, FSM 504 for subsystem 304A involves transitioning to holder while subsystem 304B is shown as "failed" in FSM 506 and may require a reset or some other form of repair or assistance.

Figure 6:
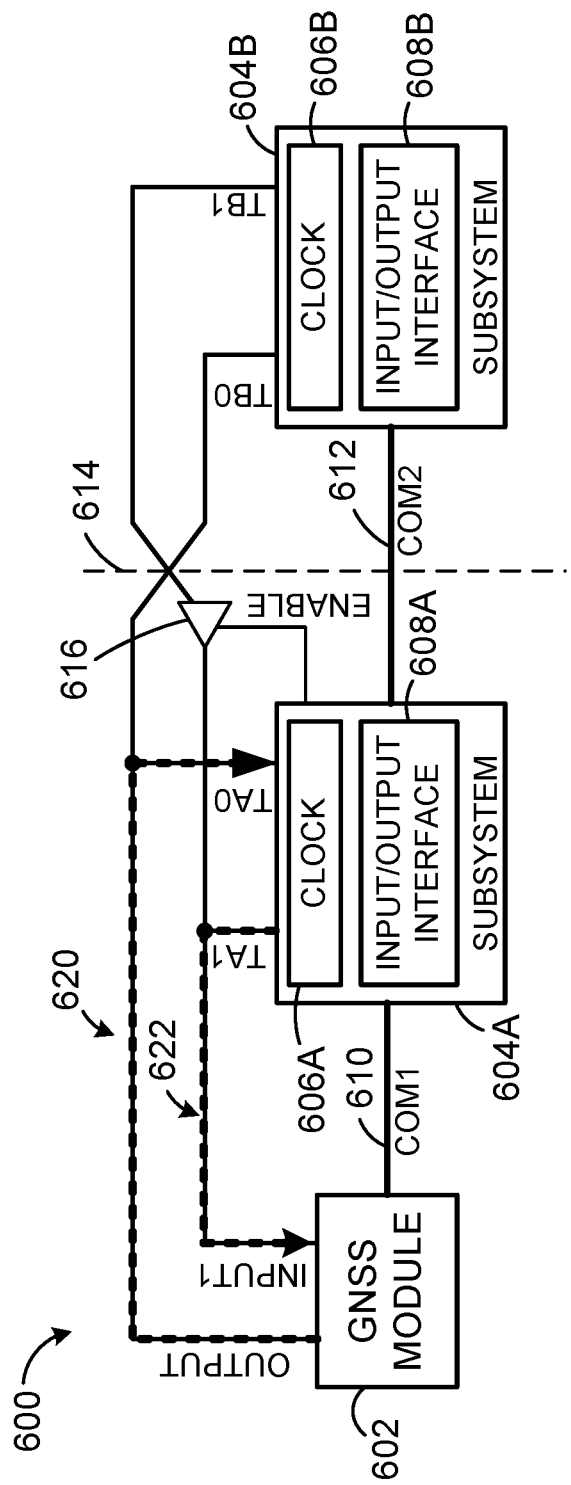
FIG. 6 illustrates another system for synchronizing subsystems in a redundant system, according to one or more example embodiments.

FIG. 6 illustrates system 600 for synchronizing subsystems 604A, 604B in a redundant system. Similar to system 300 shown in FIGS. 3 and 4A-4F, system 600 includes a hardware circuit configuration that can distribute time between GNSS module 602 and two halves of a redundant system, which are shown as subsystem 604A and subsystem 604B. Software logic that may be implemented with the hardware circuit by system 600 to enable synchronization. In some examples, system 600 may be implemented as system 100 shown in FIG. 1. In other embodiments, system 600 can have another arrangement with more or less components.

In the example embodiments, system 600 differs from system 300 at GNSS module 602. Unlike GNSS module 302, GNSS module 602 is shown with a single input (INPUT1) and does not include INPUT2 to represent GNSS receivers that only include one output and one input. In some instances, a GNSS receiver may lack multiple inputs. In such cases, system 600 can be used to synchronize clock 606A from subsystem 604A and clock 606B from subsystem 604B.

To enable similar operations with single INPUT1 at GNSS module 602, buffer 616 is included within system 600. Particularly, buffer 616 is shown positioned between subsystem 604A and subsystem 604B. The addition of buffer 616 into the wire from TB0 can be tri-stated, which enables system 600 to perform MODE 0 and MODE 2-6 as shown in FIGS. 3, 4A-4F, and 5. Buffer 616 can operate as an input controlled switch with an output that can be electronically turned "ON" and "OFF" via the external ENABLE signal input shown in FIG. 6. As such, when system 600 is in MODE 1, the ENABLE line can be used to tri-state buffer 616 with TA1 configured as an output to GNSS module 602 to enable timepulse 622 from input/output interface 608A to INPUT1 of GNSS module 602. GNSS module 602 can similarly provide timepulse 620 indicative of GNSS time to input/output interface 608A of subsystem 604A. When system 600 transitions away from MODE 1 to another mode (e.g., MODE 2), TA1 at subsystem 304A can be reconfigured to be an input and the ENABLE line is used to forward timepulses from TB0 by input/output interface 608B of subsystem 604B to GNSS module 602.

Figure 7:
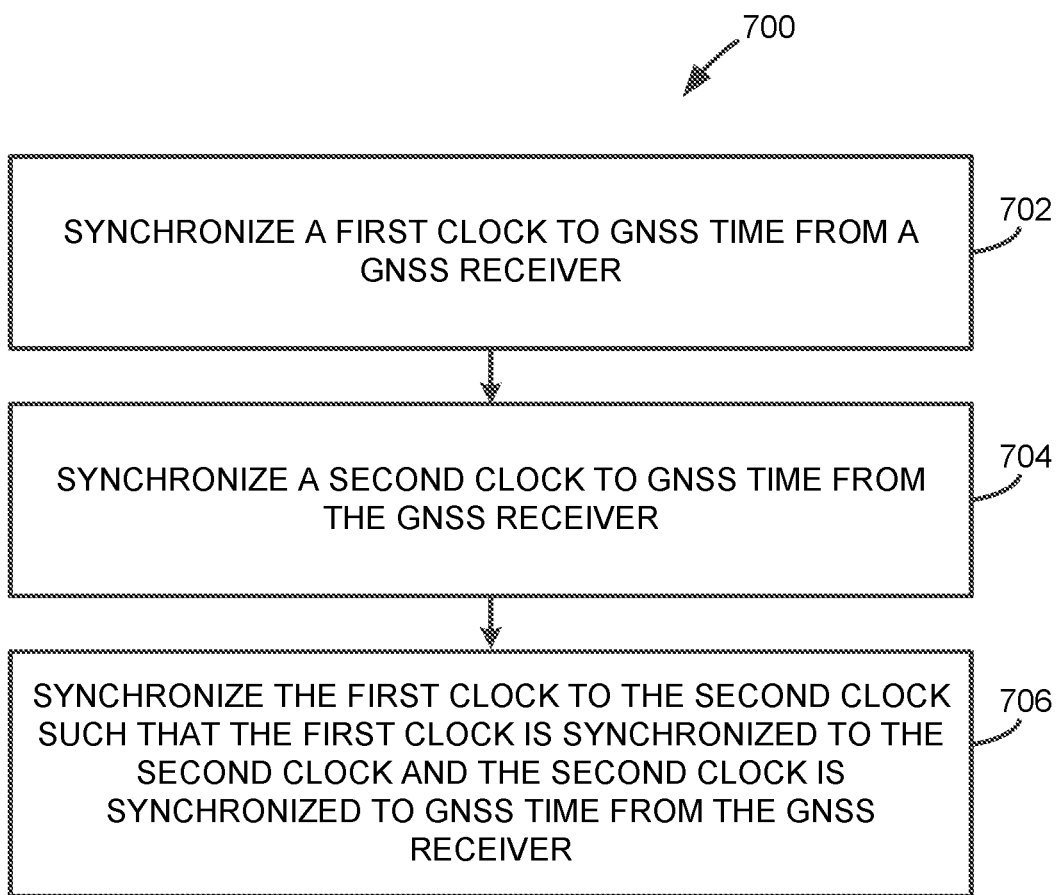
FIG. 7 is a flow chart of a method for synchronizing subsystems within a redundant system to GNSS time, according to one or more example embodiments.

FIG. 7 is a flowchart of example method 700 for GNSS synchronization of a redundant system, according to one or more embodiments. Method 700 may include one or more operations, functions, or actions, as depicted by one or more of blocks 702, 704, and 706, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves synchronizing, at a first subsystem of a redundant system, a first clock to GNSS time from a GNSS receiver. The redundant system includes the first subsystem and a second subsystem. A first communication link may be used to synchronize the first clock to GNSS time. The first communication link may enable communication between the first subsystem and the second subsystem.

In some examples, the first subsystem may be configured to determine a first path delay between the first subsystem and the GNSS receiver to synchronize the first clock to GNSS time from the GNSS receiver. In some examples, the redundant system is coupled to a vehicle with the first subsystem configured to control a first set of vehicle sensors and the second subsystem configured to control a second set of vehicle sensors.

Synchronization between the subsystems and the GNSS receiver can involve measuring the transmission and reception times of one or more timepulses that traverse between the components. In particular, sets of timepulses may be used to reduce the impact of noise when determining when a given component sent or received timepulses relative to another component. In some examples, synchronizing the first clock to GNSS time from the GNSS receiver involves determining, by the first subsystem, a first time offset between when the GNSS receiver provides a first timepulse and when the first subsystem receives the first timepulse and determining, by the first subsystem, a second time offset between when the first subsystem provides a second timepulse and when the GNSS receiver receives the second timepulse. For instance, the first subsystem may receive a first time indication representing when the GNSS receiver provided the first timepulse and a second time indication representing when the GNSS receiver received the second timepulse via a first communication link between the first subsystem and the GNSS receiver. As such, the first subsystem may determine the first time offset and the second time offset using the first time indication and the second time indication. The first subsystem may determine the first path delay between the GNSS receiver and the first subsystem based on the first time offset and the second time offset and synchronize the first clock to GNSS time from the GNSS receiver based on the first path delay.

At block 704, method 700 involves synchronizing, at the second subsystem, a second clock to GNSS time from the GNSS receiver. The synchronization of the second clock may involve using an indirect connection between the second subsystem and the GNSS receiver. In particular, the indirect connection may include both the first communication link and a second communication link that enables communication between the first subsystem and the second subsystem.

In some examples, the second subsystem is configured to determine a second path delay between the second subsystem and the GNSS receiver to synchronize the second clock to GNSS time from the GNSS receiver. In addition, synchronizing the second clock to GNSS time from the GNSS receiver may also involve determining, by the second subsystem, a third time offset between when the GNSS receiver provides a third timepulse and when the second subsystem receives the third timepulse and determining, by the second subsystem, a fourth time offset between when the second subsystem provides a fourth timepulse and when the GNSS receiver receives the fourth timepulse. The second subsystem may determine the second path delay between the GNSS receiver and the second subsystem based on the third time offset and the fourth time offset and synchronize the second clock to GNSS time from the GNSS receiver based on the second path delay.

In some instances, determining the third offset and the fourth time offset may involve receiving, at the second subsystem and from the GNSS receiver, a third time indication representing when the GNSS receiver provided the third timepulse and a fourth time indication representing when the GNSS receiver received the third timepulse via an indirect connection between the second subsystem and the GNSS receiver. The indirect connection may include the first communication link between the GNSS receiver and the first subsystem and a second communication link between the first subsystem and the second subsystem as shown in FIG. 3 and FIGS. 4A-4F. As such, the second subsystem may determine, using the third time indication and the fourth time indication, the third time offset and the fourth time offset.

At block 706, method 700 involves synchronizing, by the first subsystem using the third path delay, the first clock to the second clock such that the first clock is synchronized to the second clock and the second clock is synchronized to GNSS time from the GNSS receiver. This synchronization may be based on timepulses traversing a pair of wires that electrically connect the first subsystem, the second subsystem and the GNSS.

In some examples, the first subsystem may determine a third path delay between the first subsystem and the second subsystem based on the first path delay and the second path delay described above. The third path delay can convey the time offset between the second subsystem providing a timepulse and the first subsystem receiving the timepulse. As such, the synchronization of the first clock to the second clock may be further based on the third path delay.

In some examples, method 700 may further involve detecting, by the second subsystem, that GNSS time is unavailable from the GNSS receiver. Responsive to detecting that GNSS time is unavailable from the GNSS receiver, method 700 may involve transitioning the second clock to a holdover state such that the second clock maintains global time for the redundant system. In some instances, the first subsystem may further detect a lack of timepulses originating from the second subsystem and transition the first clock to the holdover state such that the first clock maintains the global time for the redundant system. In some cases, the first subsystem may detect a given timepulse indicative of GNSS time from the GNSS receiver. As a result, the first subsystem may synchronize the first clock of the first subsystem to GNSS time based on detecting the given timepulse indicative of GNSS time.

Figure 8:
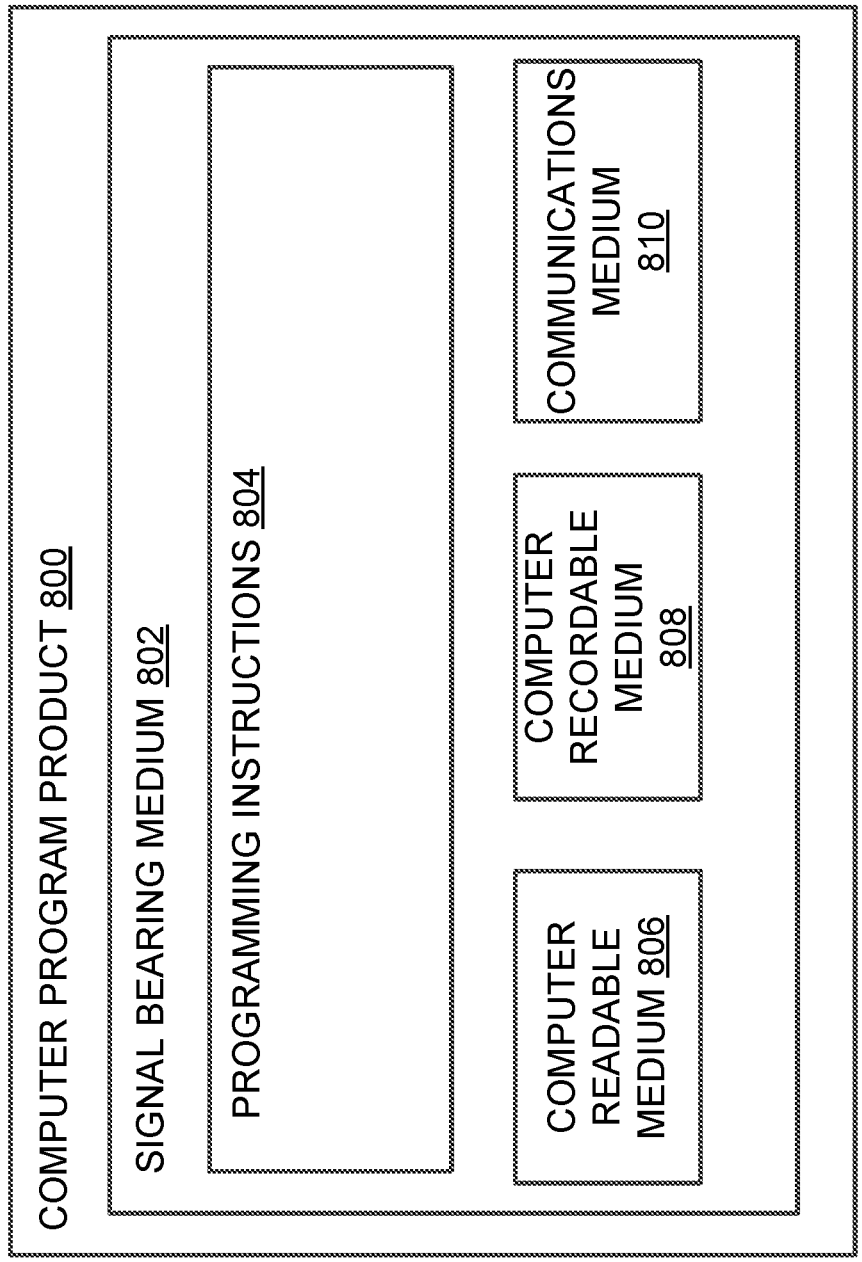
FIG. 8 is a schematic diagram of a computer program, according to example implementations.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.).

Thus, for example, the signal bearing medium 802 may be conveyed by a wireless form of the communications medium 810.

The one or more programming instructions 804 may be, for example, computer executable and/or logic implemented instructions. In some examples, a computing device such as the system 100 of FIG. 1 may be configured to provide various operations, functions, or actions in response to the programming instructions 804 conveyed to the computer system 100 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   causing, by a computing system coupled to a vehicle, a first radar subsystem to transmit a first radar signal at a first time, wherein the first time is determined based at least in part on a first clock;
   causing, by the computing system, a second radar subsystem to transmit a second radar signal at a second time, wherein the second time is determined based at least in part on a second clock,
   wherein the first radar subsystem and the second radar subsystem are part of a redundant radar system;
   wherein the first clock is synchronized to the second clock and the second clock is synchronized to Global Navigation Satellite System (GNSS) time from a GNSS receiver coupled to the computing system; and
   responsive to detecting that GNSS time is temporarily unavailable from the GNSS receiver, transitioning the second clock to a holdover state such that the second clock maintains global time for cooperative operation of the first radar subsystem and the second radar subsystem.

2. The method of claim 1, wherein the first radar subsystem and the second radar subsystem are part of a circular array of radars arranged to cover a 360 degree view that extends around the vehicle.

3. The method of claim 2, wherein the first radar subsystem controls every other radar in the circular array of radars and the second radar subsystem controls one or more remaining radars in the circular array of radars.

4. The method of claim 1, wherein causing the first radar subsystem to transmit the first radar signal at the first time comprises:
   causing a first radar to start a first chirp at the first time; and
   wherein causing the second radar subsystem to transmit the second radar signal at the second time comprises:
   causing a second radar to start a second chirp at the second time.

5. The method of claim 4, wherein the first radar is coupled at a first location on the vehicle and the second radar is coupled at a second location on the vehicle, wherein the first location is positioned next to the second location.

6. The method of claim 1, further comprising:
   synchronizing, at the first radar subsystem, the first clock to GNSS time from the GNSS receiver;
   synchronizing, at the second radar subsystem, the second clock to GNSS time from the GNSS receiver; and
   synchronizing the first clock to the second clock such that the first clock is synchronized to the second clock and the second clock is synchronized to GNSS time from the GNSS receiver.

7. The method of claim 6, wherein synchronizing the first clock to GNSS time from the GNSS receiver comprises:
   synchronizing the first clock to GNSS time from the GNSS receiver via a first communication link.

8. The method of claim 7, wherein synchronizing the second clock to GNSS time from the GNSS receiver comprises:
   synchronizing the second clock to GNSS time from the GNSS receiver using the first communication link and a second communication link, wherein the second communication link enables communication between the first radar subsystem and the second radar subsystem.

9. The method of claim 8, wherein synchronizing the first clock to the second clock comprises:
   synchronizing the first clock to the second clock based on timepulses traversing a pair of wires, wherein the first radar subsystem, the second radar subsystem, and the GNSS receiver are electrically coupled together via the pair of wires.

10. The method of claim 9, further comprising:
    determining a first path delay between the first radar subsystem and the GNSS receiver based on synchronizing the first clock to GNSS time from the GNSS receiver; and
    determining a second path delay between the second radar subsystem and the GNSS receiver based on synchronizing the second clock to GNSS time from the GNSS receiver; and
    based on the first path delay and the second path delay, determining a third path delay between the first radar subsystem and the second radar subsystem.

11. The method of claim 10, wherein synchronizing the first clock to the second clock comprises:
    synchronizing the first clock to the second clock further based on the third path delay.

12. The method of claim 11, wherein synchronizing the first clock to GNSS time from the GNSS receiver further comprises:
    determining a first time offset between when the GNSS receiver provides a first timepulse and when the first radar subsystem receives the first timepulse;

determining a second time offset between when the first radar subsystem provides a second timepulse and when the GNSS receiver receives the second timepulse;

determining the first path delay between the GNSS receiver and the first radar subsystem based on the first time offset and the second time offset; and synchronizing the first clock to GNSS time from the GNSS receiver based on the first path delay.

13. The method of claim 12, wherein determining the first time offset and the second time offset comprises:

receiving, at the first radar subsystem and from the GNSS receiver, a first time indication representing when the GNSS receiver provided the first timepulse and a second time indication representing when the GNSS receiver received the second timepulse via the first communication link between the first radar subsystem and the GNSS receiver; and determining, by the first radar subsystem using the first time indication and the second time indication, the first time offset and the second time offset.

14. The method of claim 13, wherein synchronizing the second clock to GNSS time from the GNSS receiver comprises:

determining a third time offset between when the GNSS receiver provides a third timepulse and when the second radar subsystem receives the third timepulse;

determining a fourth time offset between when the second radar subsystem provides a fourth timepulse and when the GNSS receiver receives the fourth timepulse;

determining the second path delay between the GNSS receiver and the second radar subsystem based on the third time offset and the fourth time offset; and synchronizing the second clock to GNSS time from the GNSS receiver based on the second path delay.

15. The method of claim 14, wherein determining the third time offset and the fourth time offset comprises:

receiving, at the second radar subsystem and from the GNSS receiver, a third time indication representing when the GNSS receiver provided the third timepulse and a fourth time indication representing when the GNSS receiver received the fourth timepulse via an indirect connection between the second radar subsystem and the GNSS receiver, wherein the indirect connection includes the first communication link between the GNSS receiver and the first radar subsystem and the second communication link between the first radar subsystem and the second radar subsystem; and determining, using the third time indication and the fourth time indication, the third time offset and the fourth time offset.

16. The method of claim 1, further comprising:

detecting a lack of timepulses originating from the second clock; and transitioning the first clock to the holdover state such that the first clock maintains the global time.

17. The method of claim 1, further comprising:

periodically synchronizing the first clock and the second clock to each other using a hardware-based time transfer mechanism between the first radar subsystem and the second radar subsystem, wherein the hardware-based time transfer mechanism comprises one or more of: a pulse-per-second (PPS) signal transmitted over a dedicated wire and a time message transmitted over a communication bus.

18. The method of claim 1, further comprising:

detecting that GNSS reception is temporarily insufficient to obtain precise time from the GNSS receiver; and responsive to detecting that GNSS reception is temporarily insufficient, initiating the transition of the second clock to the holdover state.

19. A vehicle comprising:

a Global Navigation Satellite System (GNSS) receiver;

a vehicle radar system comprising a first radar subsystem having a first radar and a second radar subsystem having a second radar, wherein the vehicle radar system is configured to:

cause the first radar subsystem to transmit a first radar signal at a first time, wherein the first time is determined based at least in part on a first clock;

cause the second radar subsystem to transmit a second radar signal at a second time, wherein the second time is determined based at least in part on a second clock, wherein the first clock is synchronized to the second clock and the second clock is synchronized to GNSS time from the GNSS receiver; and responsive to detecting that GNSS time is temporarily unavailable from the GNSS receiver, transition the second clock to a holdover state such that the second clock maintains global time for cooperative operation of the first radar subsystem and the second radar subsystem.

20. A non-transitory computer-readable medium configured to store instructions, that when executed by a vehicle radar system comprising a first radar subsystem and a second radar subsystem, causes the vehicle radar system to perform operations comprising:

causing the first radar subsystem to transmit a first radar signal at a first time, wherein the first time is determined based at least in part on a first clock;

causing the second radar subsystem to transmit a second radar signal at a second time, wherein the second time is determined based at least in part on a second clock, wherein the first clock is synchronized to the second clock and the second clock is synchronized to Global Navigation Satellite System (GNSS) time from a GNSS receiver coupled to the vehicle radar system; and responsive to detecting that GNSS time is temporarily unavailable from the GNSS receiver, transitioning the second clock to a holdover state such that the second clock maintains global time for cooperative operation of the first radar subsystem and the second radar subsystem.

* * * * *